United States Patent [19]
Horsley et al.

[11] Patent Number: 5,437,786
[45] Date of Patent: Aug. 1, 1995

[54] STORMWATER TREATMENT SYSTEM/APPARATUS

[75] Inventors: Scott W. Horsley; Winfried Platz, both of Sandwich, Mass.

[73] Assignee: Stormtreat Systems, Inc., Barnstable, Mass.

[21] Appl. No.: 195,447

[22] Filed: Feb. 14, 1994

[51] Int. Cl.$^6$ .............................................. C02F 3/32
[52] U.S. Cl. .................................. 210/170; 210/253; 210/256; 210/301; 210/532.2; 210/602
[58] Field of Search ............... 210/170, 253, 256, 259, 210/300, 301, 532.2, 602, 747, 150, 151

[56] References Cited

U.S. PATENT DOCUMENTS

| | | | |
|---|---|---|---|
| 732,208 | 6/1903 | Mitchell | 210/253 |
| 1,573,929 | 2/1926 | Gall | 210/301 |
| 1,902,171 | 3/1933 | Kopp | 210/301 |
| 3,770,623 | 11/1973 | Seidel | 210/170 |
| 3,817,864 | 6/1974 | Carlson et al. | 210/532.2 |
| 4,162,976 | 7/1979 | Monson | 210/170 |
| 4,293,421 | 10/1981 | Green | 210/532.2 |
| 4,824,572 | 4/1989 | Scott | 210/170 |
| 4,995,969 | 2/1991 | La Vigne | 210/170 |
| 4,997,568 | 3/1991 | Vandervelde et al. | 210/170 |
| 5,073,257 | 12/1991 | Higa | 210/170 |

FOREIGN PATENT DOCUMENTS 58-70890  4/1983  Japan .

*Primary Examiner*—Christopher Upton
*Attorney, Agent, or Firm*—Lahive & Cockfield

[57] ABSTRACT

A method and apparatus for treating contaminated stormwater runoff from roads and adjacent lands. A multi-stage and self-contained system designed to collect the "first flush" of stormwater runoff (which contains the majority of pollutants) and to treat the pollutants using sedimentation, filtration and constructed wetlands. The apparatus is mass-produced to provide standardized hydrologic controls, important to the reliability of the constructed wetland component of the apparatus.

Raw stormwater enters the central sedimentation chamber of the apparatus which is divided into multiple segments designed to provide a series of sedimentation/filtration chambers. Each chamber is divided by a removable filter bulkhead sequenced from coarse to fine sediment sizes. Effluent from the final sedimentation chamber is discharged to the constructed wetland system which surrounds the central sedimentation basin. Water flows through the perimeter wetland system in subsurface/saturated conditions and contacts the root zone of the constructed wetland where biochemical interactions attenuate pollutants.

Hydrologic control valves in the apparatus regulate the flow of water from the sedimentation basin to the wetland and the effluent discharge rate out of the wetland. This control and the standardization of the construction allows for precise hydrologic controls designed to provide a 5–10 day holding time within the apparatus.

11 Claims, 2 Drawing Sheets

STORMWATER TREATMENT SYSTEM/APPARATUS

BACKGROUND OF THE INVENTION

Stormwater runoff is water generated by rain contacting impervious and semi-pervious land surfaces which contains significant amounts of contaminants. These contaminants are routinely transported to and discharged into downgradient wetlands, streams, lakes and coastal waters (EPA 1983).

Stormwater pollutants include bacteria, viruses, metals, nutrients, oils and other organic compounds. Throughout the United States, stormwater pollution has resulted in the closure of shellfish beds, the eutrophication of waters, the pollution of drinking water supplies and impacts to ecological habitats.

Numerous studies performed by have demonstrated that the first flush of runoff contains the majority of the pollutants. This is because many of the contaminants are associated with sediment particles which accumulate on road and parking lot surfaces between storms and are transported during the beginning of the first significant precipitation event. Contaminants such as oils and other hydrocarbons also collect on impervious surfaces and are typically "flushed" during the beginning of a storm event.

DISCUSSION OF THE PRIOR ART

The use of sedimentation basins and constructed wetlands to minimize stormwater pollution is known to bean effective process. The Use of Wetlands for Controlling Stormwater Pollution by Strecker et al., (The Terrine Institute, 1992) provides a summary of 20 stormwater projects throughout the United States. The use of constructed wetlands in water pollution control has been known (Higa 1989, Wengrzynek 1992 and Wolverton 1992). Constructed Wetlands for Wastewater Treatment by Donald Hammer (Lewis Publishers, 1989) provides and overview of the use of constructed wetlands for control of pollution.

There are several disadvantages to the prior art. These are listed below and are improved upon with the invention.

1. The most common problem with regard to maintaining constructed wetlands has been in controlling water levels. Large basins designed to function as constructed wetlands are subject to wide ranges of flooding and drying. As these basins are open to the atmosphere, extensive evaporation frequently leads to desiccation and death of the wetland plants. Many constructed wetlands have failed for this reason. The invention improves upon this with an enclosed and unified sedimentation basin and constructed wetland providing reliable hydrologic controls.

2. Prior art systems are designed on a case-by-case basis resulting in high engineering costs and highly-variable results. These systems are constructed on-site and their success is dependent upon individual hydrologic analyses for that particular site. The invention improves upon this by standardizing the design, the only variable being the number of units which is easily determined by the size of the drainage area and the design storm selected.

3. Although the scientific literature clearly indicates that the greatest pollution attenuation capabilities exist within the subsurface (the root zone), the vast majority of prior art constructed wetland systems rely upon treatment within the above surface zone of the wetland. The invention improves upon this by maintaining the discharge from the sedimentation basin to the wetland subsurface.

4. The prior art for constructed wetlands results in standing surface water. In fact many of the designs encourage a "permanent pool" associated with a wetland. Such standing water commonly results as a mosquito habitat. As many stormwater treatment systems are in residential areas this can present both a nuisance and potentially a public health hazard. As the pollutant concentrations can be expected to be high in this standing water, mosquitos and other wildlife are subjected to elevated levels of bacteria, viruses, metals and hydrocarbons. This can result in both acute and chronic impacts to wildlife and in the case of mosquitos may present a potential public health vector problem.

5. Much of the prior art utilizes concrete structures for leaching basins and sedimentation tanks. Such structures are heavy, awkward to handle in sensitive sites near wetlands and other water resources. The invention is to be manufactured of plastic and is significantly less weight, thereby eliminating the need for heavy equipment (such as cranes) for installation purposes.

SUMMARY OF THE INVENTION

The invention discloses the use of a pre-fabricated structure to provide the treatment of stormwater by employing sedimentation, oil and grease separation, filtration and constructed wetlands. The invention incorporates all three of these previously-known pollution control technologies into one self-contained apparatus. By integrating these technologies into a single unit, this apparatus optimizes flow rates through the system to maximize sedimentation rates, filtration efficiency and biochemical attenuation within the root zone of the constructed wetland, resulting in a more reliable and efficient treatment mechanism than prior systems.

The invention is designed to be modular and installed in series to minimize the inflow rates and subsequently the turbulence within each tank (thereby maximizing sedimentation rates). The number of tanks is determined based upon the drainage area and the desired design flow to be caught and treated. In this way retention times are maximized within each unit, providing increased pollutant attenuation opportunities. The modular design also provides flexibility in locating the units in areas with difficult site constraints (common to many road drainage discharge sites). The flow rates within the apparatus are controlled by the outlet valve. A hydraulic gradient is established throughout the system, The hydraulic gradient is controlled in part by the hydraulic properties of the sand and gravel substrate within the wetland system. The outlet valve can be adjusted to accommodate various climatic environments. For example, in the southwestern United States where little or no precipitation occurs throughout the summer months, the outlet valve of the apparatus can be closed after the last major rain event, holding the water as an irrigation source for the constructed wetland throughout the dry season. The apparatus has been sized to accommodate applications in this environment by balancing the evapotranspiration rates with the holding volume of the system.

The invention is unique when compared to prior sedimentation and constructed wetland systems in that it operates subsurface and self-contained. This enables longer storage of stormwater in droughty climates (as discussed above), it eliminates direct exposure of polluted surface water to humans and animals, and it eliminates the breeding of mosquitoes (common to many open detention ponds).

DETAILED DESCRIPTION OF THE INVENTION

Referring to the drawings.

Figure 1:
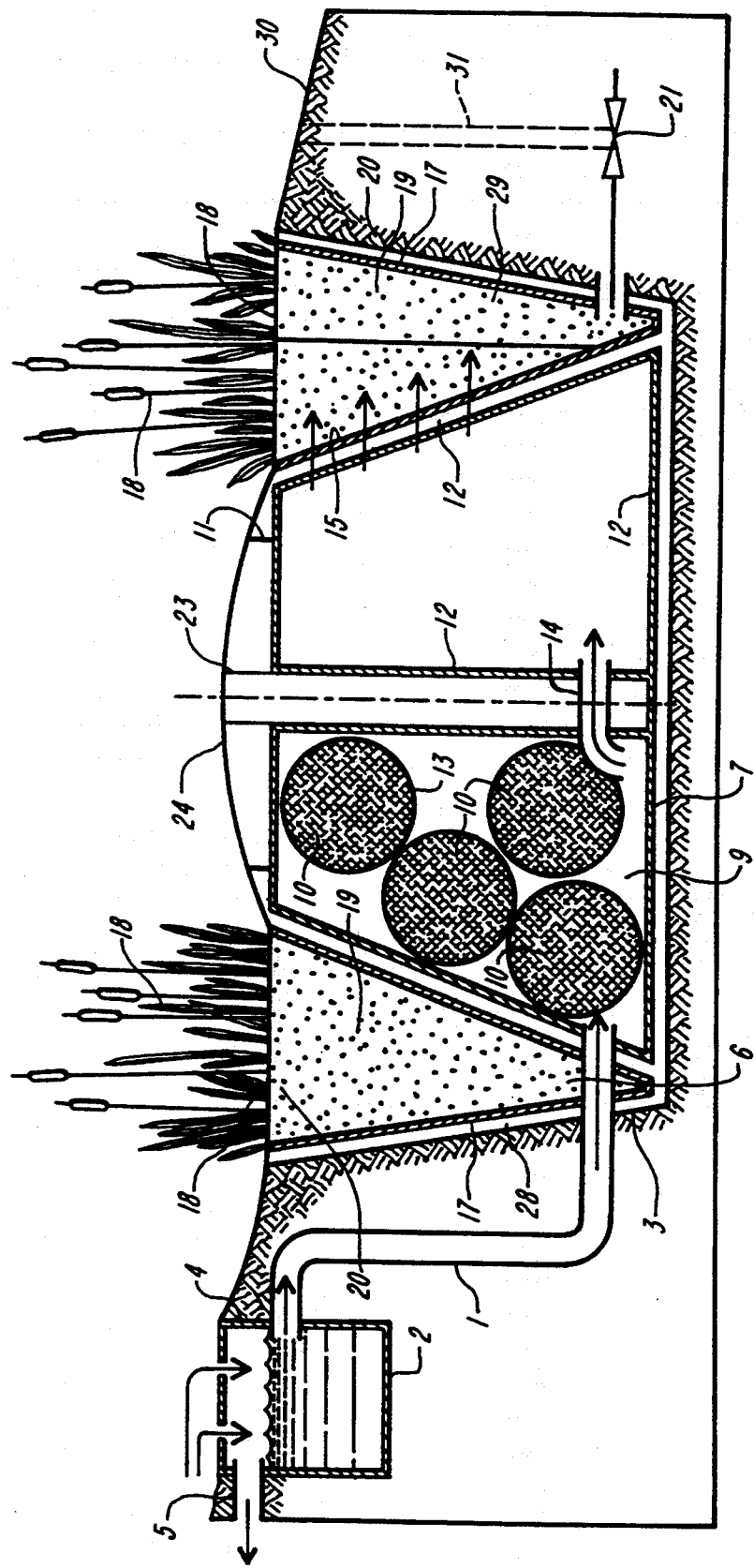
FIG. 1 is a diagrammatic depiction of the apparatus shown in cross section.
Figure 2:
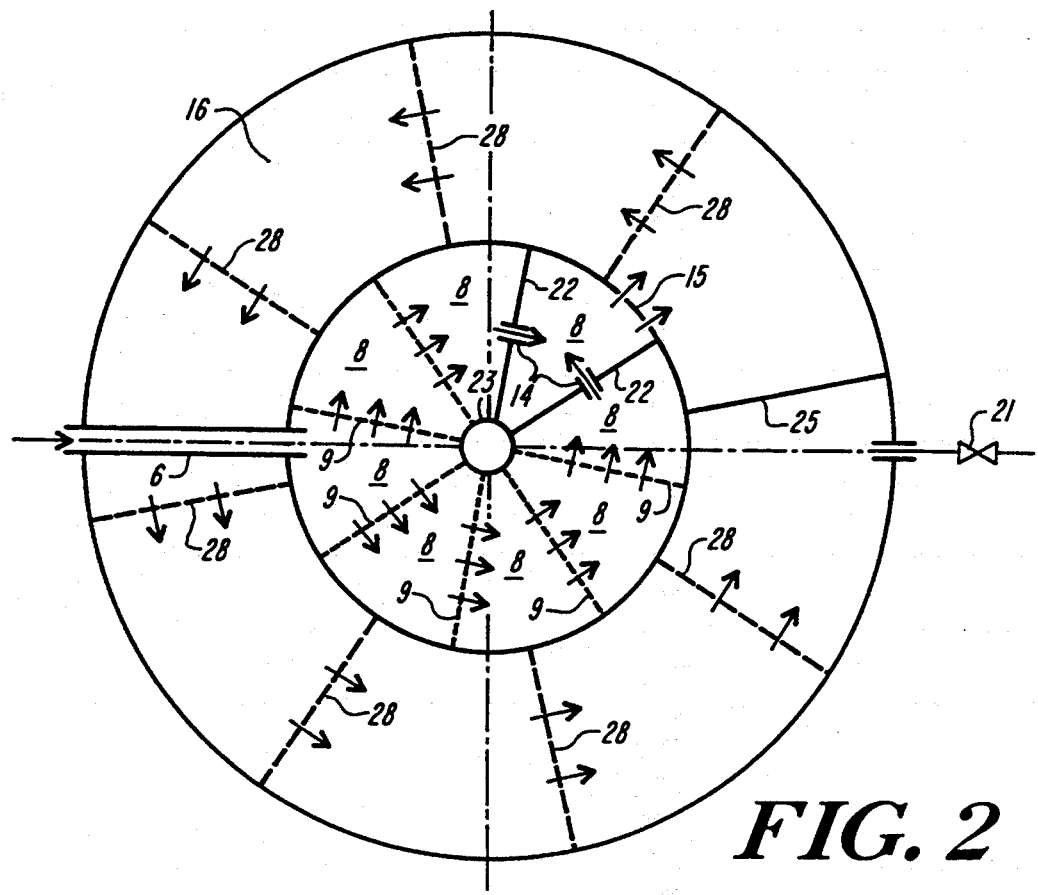
FIG. 2 shows a top view of the apparatus showing the internal chambers and the flow path of water throught the system.
Figure 3:
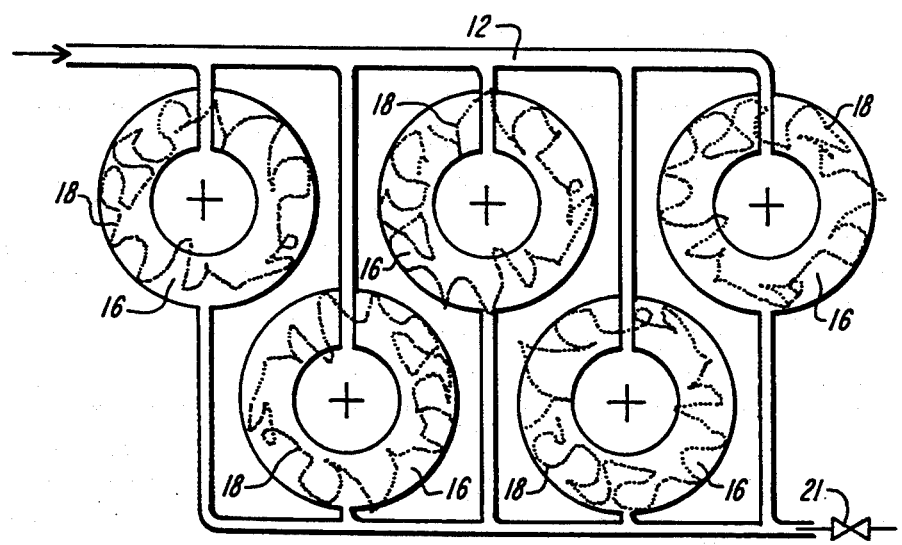
FIG. 3 shows a top view of an example configuration of the apparatus with the individual tanks connected in parallel circuit.

Referring to FIGS. 1, 2 and 3: A "manifold feeder pipe" 1 conveys stormwater from a catch basin 2 (or other device) and distributes it equally to each treatment tank 3 (only one tank is shown in FIG. 1). The "manifold feeder pipe" 1 is constructed of PVC and (when used in conjunction with a catch basin 2) is installed into the sidewall 4 of the catch basin. An "overflow pipe" 5 is also installed into the catch basin approximately 6 inches higher than the "manifold feeder pipe" 1 to provide for the discharge of stormwater in excess of the first flush (one half to one-inch of runoff).

The "manifold feeder pipe" 1 discharges the stormwater through the "inflow port" 6 to each of the sedimentation tanks 3 which are placed in ground 30 with the tops flush with the lands surface. The inflow port 6 is located on the inner wall of the central sedimentation basin 7. Water flows through eight chambers 8, between which a series of "filtration bulkheads" 9 are placed.

The "filtration bulkheads" 9 support a series of sequentially-finer mesh "filters" 10 to preferentially trap different grain size sediments in each chamber 8. The filter bulkheads 9 can be easily removed through a centrally-located "manhole" 11 and cover 24 located on the top of the system. Each "filter bulkhead" 9 slides into and out of the sedimentation basin 7 through a set of "filter bulkhead tracks" 12 molded onto the bottom and the sides of the sedimentation basin 7. They are also secured to a "center support pillar" 23 which is easily removable to access and remove the filtration bulkeads. Each filter 10 is affixed to the bulkhead 9 using an easily-removable "filter clip" 13.

The final sedimentation chamber 8 is preceded by oil and grease traps 14. It contains the "infiltration wall" 15 to the "perimeter wetland system 16. Water is directed counter-clockwise towards the outlet control valve 21 by a solid bulkheads 25. The wetland system 16 is contained within a water-tight V-shaped basin 17, which surrounds the central sedimentation basin 7. The V-shaped basin 17 is segmented by perforated bulkheads 28. It is filled with sand and gravel and is planted with a combination of wetland plants 18 (such as cattails, burreed and bullrush). The 3-4 foot depth of the sand and gravel 19 supports the root zone 20 of the wetland plants 18 and provides a constant source of soil moisture to support the plant community and also the root treatment zone 20 though which the stormwater must flow.

Biochemical activities associated with microbes which grow within the root zone 20 provide treatment (including denitrification) of the water passing through the constructed wetland 16. The sand and gravel matrix 19 which serves as a substrate for the wetland plants 18 also provides a filtering medium for pollutants such as coliform bacteria and as a precipitation site for other pollutants such as phosphorus.

The "effluent outlet control valve" 21 controlled remotely through an "access well" 31 regulates the rate of discharge from the perimeter wetland 16 and in this manner controls the holding (retention) time within the entire system. For most applications the holding time will be set at 5-10 days to provide adequate sedimentation, oil/grease separation times and contact time within the wetland system 16. This holding time also enables the system to be available to catch the next storm which might generate significant loadings of pollutants (storm events in the interim are not believed to generate significant pollutant loading due to inadequate time for the pollutants to be deposited within the drainage area).

It can thus be seen that the invention as disclosed is a particularly advantageous construction for a self-contained and multi-stage stormwater treatment system.

We claim:

1. A system for purification of stormwater comprising a multiplicity of substantially identical unitary treatment modules, each module having multiple stages integrated into one water tight unit, including a central sedimentation tank, an oil and grease trap within said central sedimentation tank, and a constructed wetland having wetland plants planted therein, fluidly coupled to said central sedimentation tank and said oil and grease trap to provide subsurface flow within said constructed wetland, said multiplicity of structures being coupled in parallel circuit to an entrance port for receiving said stormwater, said multiplicity of modules also being coupled to an exit port including a valved outlet port for controlling stormwater throughput from said entrance port to said exit port.

2. A purification system of claim 1 wherein said stormwater is conveyed from a catch basin to said multiplicity of treatment modules by a manifold feeder pipe which equally distributes the stormwater to each of said unitary treatment modules.

3. A storm water treatment apparatus comprising,
a lightweight watertight integrated sedimentation tank module, said sedimentation tank module having a central sedimentation tank within it, formed integrally with an annular perimeter basin, also within said sedimentation tank module,
said central sedimentation tank having a removable watertight cover,
said annular perimeter basin having an open top and a wetland formed of sand and gravel deposited within it, said open top including wetland plants, having roots extending downwardly into said sand and gravel, said central sedimentation tank including an inlet port from outside said basin for carrying stormwater into said covered central sedimentation tank and having an infiltration section in the wall between it and the annular perimeter basin, said infiltration section being located generally diametrically opposite to said inlet port, said sedimentation tank comprising filter means between said inlet port and said infiltration section being transmissive of water, but generally not transmissive of particulate materials and said infiltration section being located to pass water into said perimeter basin in the subsurface area of said wetland plants roots, and;

an outlet port located near the bottom of said annular perimeter basin, said outlet port including valve means which can be preset to control the throughput of water entering said sedimentation tank and exiting said annular perimeter basin at said outlet port.

4. Apparatus in accordance with claim 3 wherein said central sedimentation tank is cylindrical.

5. Apparatus in accordance with claim 4 wherein said wetlands material is sufficiently heavy to counter buoyancy forces applied against said sedimentation tank.

6. Apparatus in accordance with claim 4 wherein said central sedimentation tank is formed with a plurality of bulkheads each extending radially from the center of said central sedimentation tank to the perimeter thereof, one of said bulkheads adjacent to said infiltration section being formed to comprise an oil and grease trap and the remainder of said bulkheads being formed with filter panels therein in the plane of said bulkhead to permit flow of water through said bulkheads while screening particulate material.

7. Apparatus in accordance with claim 6 wherein said annular perimeter basin is segmented by a series of perforated bulkheads spaced along its perimeter, each extending inwardly to the perimeter of said central sedimentation tank, one of said bulkheads adjacent to said outlet port and to said infiltration panel being impermeable to water.

8. Apparatus in accordance with claim 6 wherein said filters are arranged so that in successive bulkheads the filters provide a series of coarser to finer filters sequenced in the direction of flow of said stormwater.

9. Apparatus in accordance with claims 3, 4 or 5 in which said tank module is formed of a plastic.

10. Apparatus in accordance with claim 3 wherein said annular perimeter basin has a V-shaped cross section.

11. Apparatus in accordance with claim 3 wherein said sedimentation tank comprises a grease and oil trap.

* * * * *